(12) United States Patent
Wakabayashi

(10) Patent No.: US 7,487,266 B2
(45) Date of Patent: Feb. 3, 2009

(54) COMMUNICATION SYSTEM AND METHOD, AND DISTRIBUTED CONTROL SYSTEM AND METHOD

(75) Inventor: Shinji Wakabayashi, Anjo (JP)

(73) Assignee: Denso Corporation (JP)

( * ) Notice: Subject to any disclaimer, the term of this patent is extended or adjusted under 35 U.S.C. 154(b) by 215 days.

(21) Appl. No.: 11/546,398

(22) Filed: Oct. 12, 2006

(65) Prior Publication Data

US 2007/0088883 A1     Apr. 19, 2007

(30) Foreign Application Priority Data

Oct. 13, 2005   (JP)   ............... 2005-299013
Nov. 24, 2005   (JP)   ............... 2005-338825

(51) Int. Cl.
  G06F 3/00    (2006.01)
  H03K 7/08    (2006.01)
  H04B 1/56    (2006.01)

(52) U.S. Cl. .................. 710/21; 710/105; 710/110; 370/212; 375/238

(58) Field of Classification Search ............ 710/21, 710/29, 105, 106, 110, 31, 33; 370/212, 370/276; 375/237, 238
See application file for complete search history.

(56) References Cited

U.S. PATENT DOCUMENTS 3,967,058 A * 6/1976 Moriya et al. ............ 370/294
4,924,463 A * 5/1990 Thomas et al. ............ 370/520
5,469,285 A * 11/1995 Gut ............................. 398/41
5,631,757 A * 5/1997 Bodeep et al. ............. 398/138
5,905,716 A * 5/1999 Vidales ....................... 370/276
6,625,206 B1 * 9/2003 Doblar ........................ 375/219
7,106,793 B2 * 9/2006 Spichale ..................... 375/238

FOREIGN PATENT DOCUMENTS

JP     8-265308    10/1996

OTHER PUBLICATIONS

Definition of Local Interconnect Network, Wikipedia, <http://en.wikipedia.org/wiki/Local_Interconnect_Network>, accesed on Nov. 7, 2008.*
LIN Bus, A Cost-Effective Alternative to CAN, Xilinx, 2004.*

* cited by examiner

*Primary Examiner*—Khanh Dang
(74) *Attorney, Agent, or Firm*—Nixon & Vanderhye PC

(57) ABSTRACT

A communication system performs bidirectional communication through a same communication path every communication cycle period between a master station and a slave station. From the start of the communication cycle period until an interval period shorter than the communication cycle period elapses, the master station transmits master data represented at a first ratio of first pulse width to the communication cycle period to the slave station. In a remaining period after the interval period in the communication cycle period, the slave station transmits slave data represented at a second ratio of second pulse width to the interval period to the master station.

23 Claims, 14 Drawing Sheets

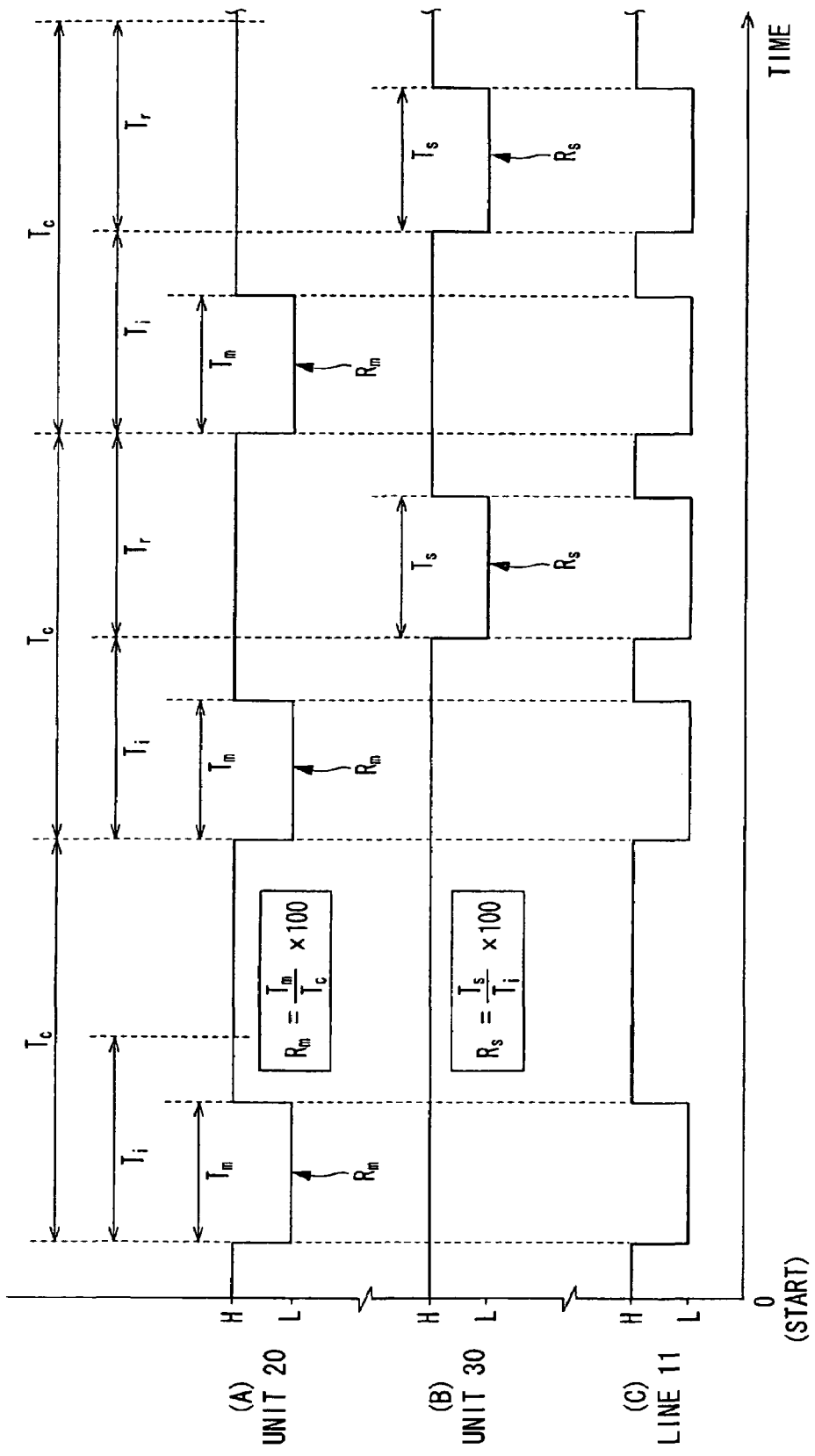

| COMMAND DATA | RATIO $R_m$ (%) |
|---|---|
| 0° (FULL CLOSE) | 2.5 |
| ⋮ | ⋮ |
| 90° (FULL OPEN) | 25 |

| STATE DATA | RATIO $R_s$ (%) |
|---|---|
| 0° (FULL CLOSE) | 6.25 |
| ⋮ | ⋮ |
| 90° (FULL OPEN) | 62.5 |

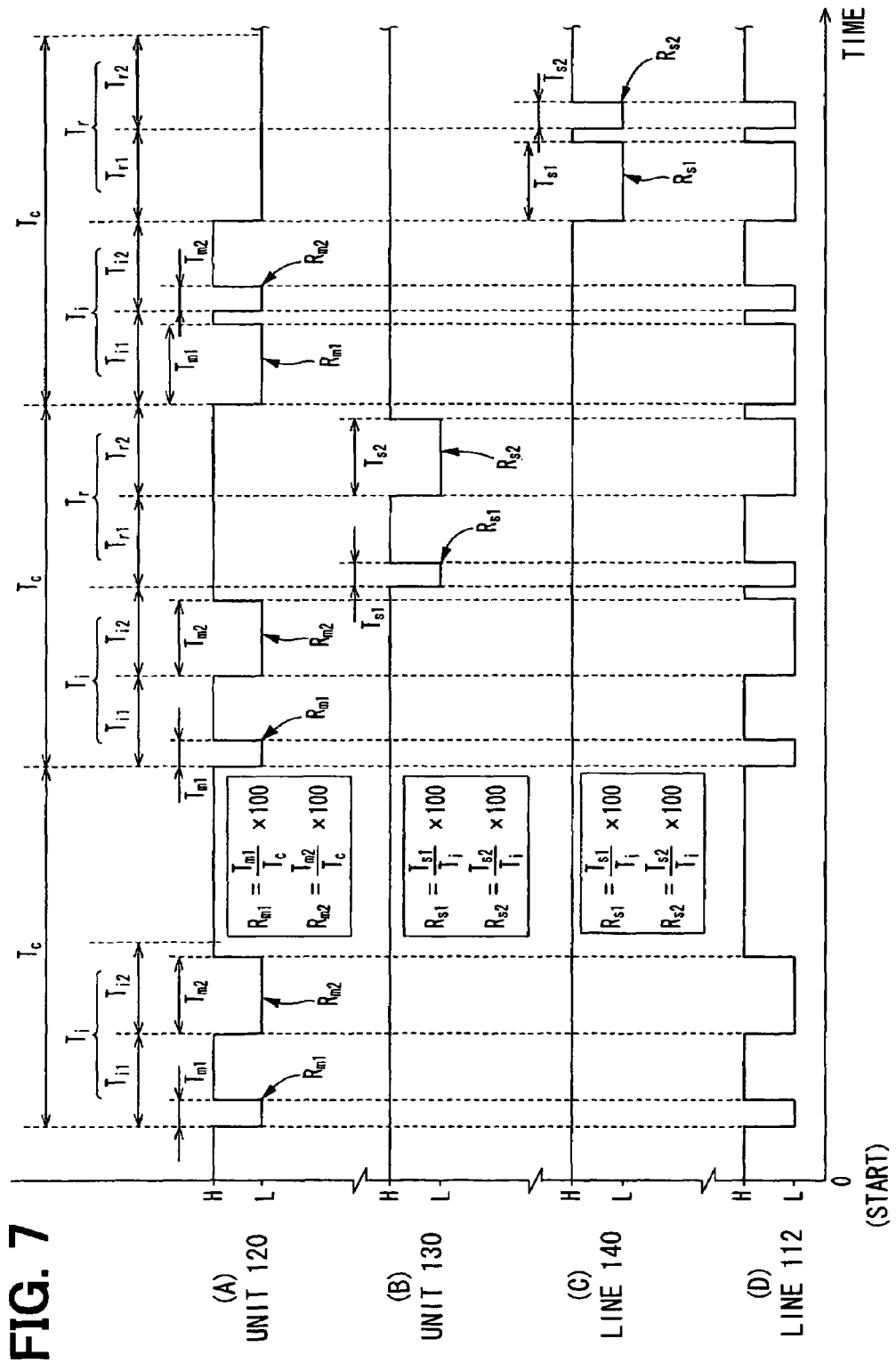

FIG. 8A

| COMMAND TARGET | TARGET SPECIFYING DATA | RATIO $R_{m1}$ (%) |
|---|---|---|
| FIRST INTAKE | 1 | 2.5 |
| SECOND INTAKE | 2 | 25 |

FIG. 8B

| COMMAND DATA | RATIO $R_{m2}$ (%) |
|---|---|
| 0° | 2.5 |
| ⋮ | ⋮ |
| 90° | 25 |

FIG. 9A

| RESPONSE PROCESSING | SELF-SPECIFYING DATA | RATIO $R_{s1}$ (%) |
|---|---|---|
| FIRST INTAKE | 1 | 6.25 |
| SECOND INTAKE | 2 | 62.5 |

FIG. 9B

| STATE DATA | RATIO $R_{s2}$ (%) |
|---|---|
| 0° | 6.25 |
| ⋮ | ⋮ |
| 90° | 62.5 |

FIG. 12

| COMMAND DATA | RATIO $R_M$ (%) |
|---|---|
| 0° (FULL CLOSE) | 100 |
| ⋮ | ⋮ |
| 45° | 200 |
| ⋮ | ⋮ |
| 90° (FULL OPEN) | 300 |

FIG. 13

| STATE DATA | RATIO $R_S$ (%) |
|---|---|
| 0° (FULL CLOSE) | 100 |
| ⋮ | ⋮ |
| 45° | 200 |
| ⋮ | ⋮ |
| 90° (FULL OPEN) | 300 |

FIG. 18A

| MASTER DATA TYPE | RATIO $P_{MO}$ (%) |
|---|---|
| COMMAND | ≦100 |
| MONITOR | >100 |

FIG. 18B

| MASTER DATA TYPE | RATIO $P_M$ (%) |
|---|---|
| COMMAND | ≦100 |
| MONITOR | >100 |

FIG. 19A

| COMMAND DATA | RATIO $r_M$ (%) |
|---|---|
| 0° (FULL CLOSE) | 100 |
| ⋮ | ⋮ |
| 45° | 200 |
| ⋮ | ⋮ |
| 90° (FULL OPEN) | 300 |

FIG. 19B

| MONITOR DATA | RATIO $r_M$ (%) |
|---|---|
| 8V | 100 |
| ⋮ | ⋮ |
| 12V | 200 |
| ⋮ | ⋮ |
| 16V | 300 |

FIG. 20A

| SLAVE DATA TYPE | RATIO $P_{so}$ (%) |
|---|---|
| STATE | $\leq 100$ |
| DIAGNOSIS | $>100$ |

FIG. 20B

| SLAVE DATA TYPE | RATIO $P_s$ (%) |
|---|---|
| STATE | $\leq 100$ |
| DIAGNOSIS | $>100$ |

FIG. 21A

| STATE DATA | RATIO $r_s$ (%) |
|---|---|
| 0° (FULL CLOSE) | 100 |
| ⋮ | ⋮ |
| 45° | 200 |
| ⋮ | ⋮ |
| 90° (FULL OPEN) | 300 |

FIG. 21B

| DIAGNOSIS DATA | RATIO $r_s$ (%) |
|---|---|
| NORMALITY | 100 |
| UNIT ABNORMALITY | 200 |
| DETECTION ABNORMALITY | 300 |

COMMUNICATION SYSTEM AND METHOD, AND DISTRIBUTED CONTROL SYSTEM AND METHOD

CROSS REFERENCE TO RELATED APPLICATION

This application is based on and incorporates herein by reference Japanese Patent Applications No. 2005-299013 filed on Oct. 13, 2005 and No. 2005-338825 filed on Nov. 24, 2005.

FIELD OF THE INVENTION

The present invention relates to bidirectional communication between a master station and a slave station through a same communication path of communication.

BACKGROUND OF THE INVENTION

Conventionally, LIN (local interconnect network) has been widely used as a short range communication technology. The LIN is a technology for achieving bidirectional communication between a master station and a slave station through a same communication path of communication. This technology has been developed to distributedly control multiple control targets mounted in a vehicle. The LIN is characterized in that, in data transmission based on pulse width, to reduce communication errors attributed to a communication clock difference between communication stations, data for baud rate adjustment is transmitted from the master station to the slave station to bring a baud rate of the slave station and a baud rate of the master station into agreement, based on that baud rate data. According to this characteristic, although highly reliable distributed control can be achieved, transmission of data for baud rate adjustment unreasonably extends communication time. Particularly in a distributed control system, the LIN is not so preferable because of possible reduction in control response.

Conventionally, as a technology for achieving bidirectional communication between a master station and a slave station through a same communication path of communication, JP-8-265308A proposes that data represented by the duty ratio of pulses is transmitted from a master station to a slave station, while data represented by pulse amplitude is transmitted from the slave station to the master station. Thus, the bidirectional data transmission is achieved every communication cycle period. According to this characteristic, since communication time can be reduced. As a result, if this technology is used in a distributed control system, high control response is expected to be obtained.

In the technology disclosed in JP-8-265308A, the duty ratio of pulses can be easily changed by using an electric circuit for LIN. However, to change the amplitude of pulses, it is necessary to provide the slave station with a special electric circuit for adjusting and outputting the amplitude of transmission pulses, and provide the master station with a special electric circuit for detecting the amplitude of reception pulses. As a result, costs will increase.

SUMMARY OF THE INVENTION

It is an object of the present invention to provide communication system and method that contribute to reduction in costs with the realization of short-time and highly accurate communication.

It is another object of the present invention to provide distributed control system and method that contributes to reduction in costs with the realization of high response and highly accurate control.

According to one aspect of the present invention, in a communication system or a distributed control system using such a communication system, a master station, a slave station and a communication path are provided for bidirectional communication between the stations every communication cycle period. The master station transmits master data represented in a ratio of pulse width to the communication cycle period to the slave station from a start of the communication cycle period until an interval period shorter than the communication cycle period elapses. The slave station transmits slave data represented in the ratio of pulse width to the interval period to the master station in a remaining period after the interval period in the communication cycle period.

According to another aspect of the present invention, in a communication system or a distributed control system using such a communication system, a master station, a slave station and a communication path are provided for bidirectional communication between the stations every communication cycle period. The master station, when a master idle period defined by it has elapsed after receiving slave data from the slave station, transmits master data represented in a ratio of pulse width to the master idle period to the slave station. The slave station, when a slave idle period defined by it has elapsed after receiving master data from the master station, transmits the slave data represented in a ratio of pulse width to the slave idle period to the master station.

BRIEF DESCRIPTION OF THE DRAWINGS

The above and other objects, features and advantages of the present invention will become more apparent from the following detailed description made with reference to the accompanying drawings. In the drawings:

FIG. 2 is a schematic operation diagram for explaining a communication method according to the first embodiment;

FIG. 7 is a schematic operation diagram for explaining a communication method according to the second embodiment;

FIGS. 8A and 8B are tables defining a communication method according to the second embodiment;

FIGS. 9A and 9B are tables defining a communication method according to the second embodiment;

FIG. 12 is a table defining a communication method according to the third embodiment;

FIG. 13 is a table defining a communication method according to the third embodiment;

FIGS. 18A and 18B are tables defining a communication method according to the fourth embodiment;

FIGS. 19A and 19B are tables defining a communication method according to the fourth embodiment;

FIGS. 20A and 20B are tables defining a communication method according to the fourth embodiment; and FIGS. 21A and 21B are tables defining a communication method according to the fourth embodiment.

DETAILED DESCRIPTION OF THE PREFERRED EMBODIMENTS

Various embodiments will be described hereunder with reference to the accompanying drawings, in which corresponding components are represented with the same reference numbers.

First Embodiment

Figure 1:
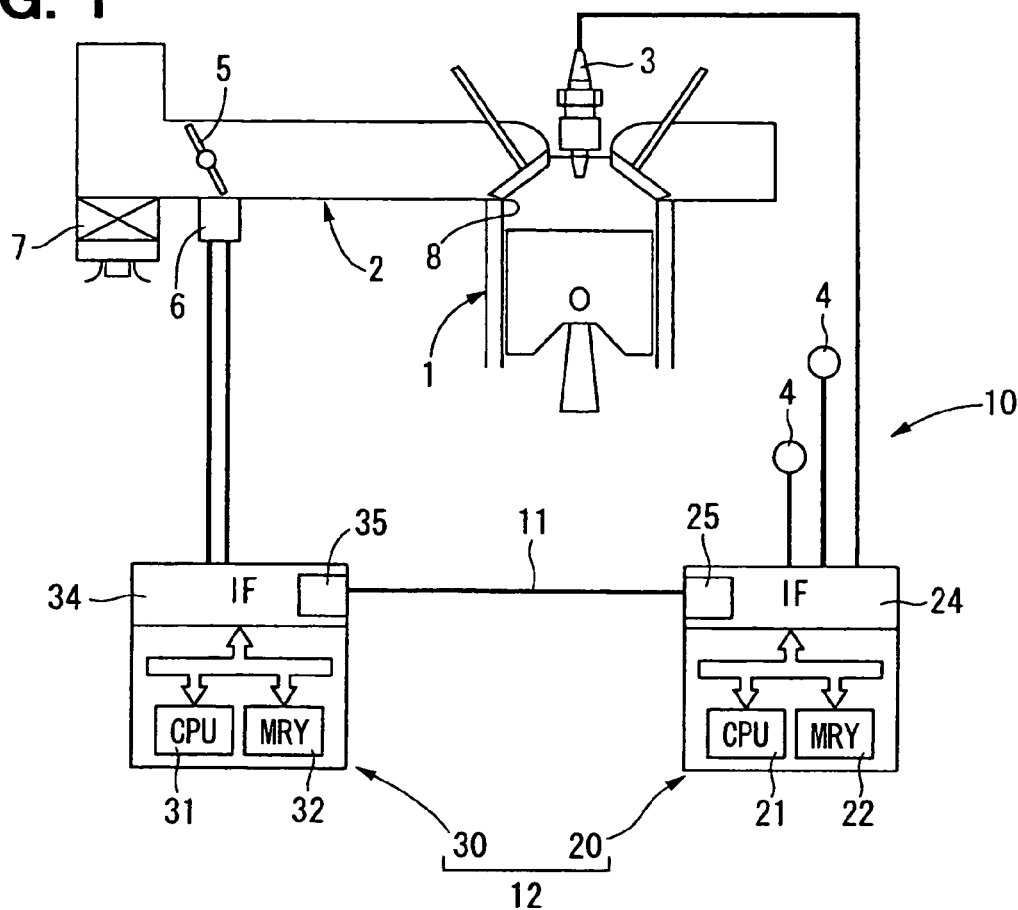
FIG. 1 is a block diagram showing a distributed control system according to a first embodiment.

Referring first to FIG. 1, a distributed control system 10 is mainly constructed with a communication system 12 that mutually connects an engine control unit 20 and an intake control unit 30 through one signal line 11 such as a cable or a wiring harness. The control system thus distributedly control targets (engine and intake system) 1 and 2 connected to the control units 20 and 30, respectively.

Figure 3:
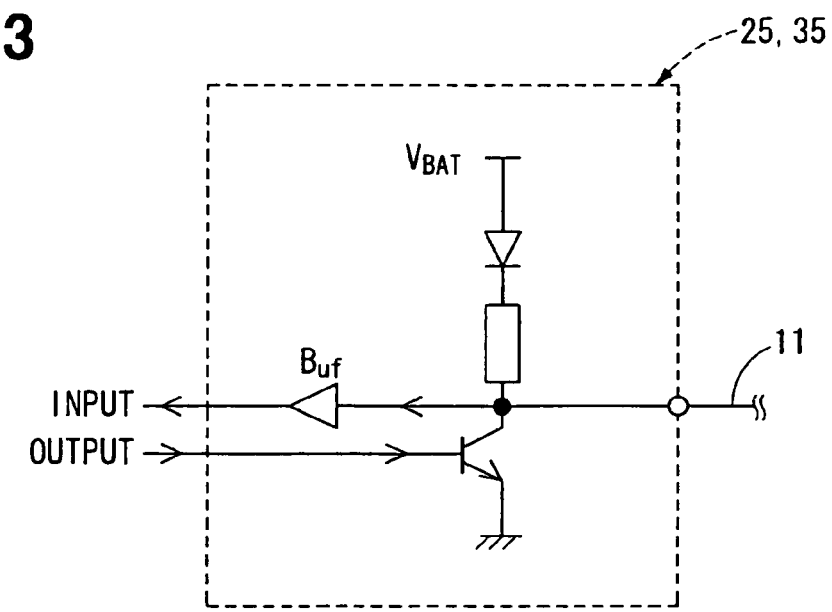
FIG. 3 is a circuit diagram showing an IF circuit of FIG. 1.

In the communication system 12, the control units 20 and 30 are constructed with electric circuits such as microcomputers that respectively include CPUs 21 and 31, memories 22 and 32, and input/output interfaces (IF) 24 and 34. The input/output IFs 24 and 34 of the control units 20 and 30 respectively include IF circuits 25 and 35 for LIN as shown in FIG. 3 as IF circuits to which a signal line 11 is connected for communication between the units 20 and 30. Therefore, for data transmission between the control units 20 and 30 through a communication path formed by the signal line 11, pulse train signals that are substantially constant in voltage amplitude between a high level (H) and a low level (L) are used as shown in (A) and (B) of FIG. 2.

The input/output IF 24 of the engine control unit 20 is connected with engine electric equipment 3 such as an igniter and an injector provided in the engine 1, and vehicle sensors 4 such as an accelerator sensor, a water temperature sensor, and a travel speed sensor provided in a vehicle. The engine control unit 20 executes a program stored in the memory 22 by the CPU 21 to feed a signal for controlling the engine 1 to the engine electric equipment 3 and receive signals representative of vehicle conditions from the vehicle sensors 4.

On the other hand, a drive unit 6 of a throttle valve 5 provided in the intake system 2 is connected to the input/output IF 34 of the intake control unit 30. The intake system 2 adjusts the flow rate of air inhaled through an air cleaner 7 by the throttle valve 5 before guiding the air to an intake port 8 of the engine 1. Therefore, the flow rate of the inhaled air depends on an opening degree (position) of the throttle valve 5. Accordingly, the intake control unit 30 executes a program stored in the memory 32 by the CPU 31 to feed a drive signal based on a target opening degree of the throttle valve 5 to the drive unit 6, and receives a signal representative of an actual opening degree of the throttle valve 5 from the drive unit 6 for feedback control.

In the communication system 12, the control units 20 and 30 execute programs stored in the memories 22 and 32 by the CPUs 21 and 31, and thereby respectively function as a master station and a slave station to achieve bidirectional communication.

Hereinafter, bidirectional communication by the communication system 12 will be described in detail. In the description below, outputs of the control units 20 and 30 that change a voltage level of the signal line 11 from the high level (H) to the low level (L) are referred to as on-pulse outputs.

When the engine 1 has been started, every communication cycle period $T_c$, the engine control unit 20 generates command data as master data from the start of each cycle period $T_c$ until an interval period $T_i$ elapses. The communication cycle period $T_c$ is set to a fixed value and stored in the memory 22 of the engine control unit 20. The interval period $T_i$ is set to a fixed value (e.g., half the cycle period $T_c$) shorter than the communication cycle period $T_c$ as shown in FIG. 2. Furthermore, the command data commands a target opening degree of the throttle valve 5 by the intake control unit 30.

Figures 4, 5, 6:
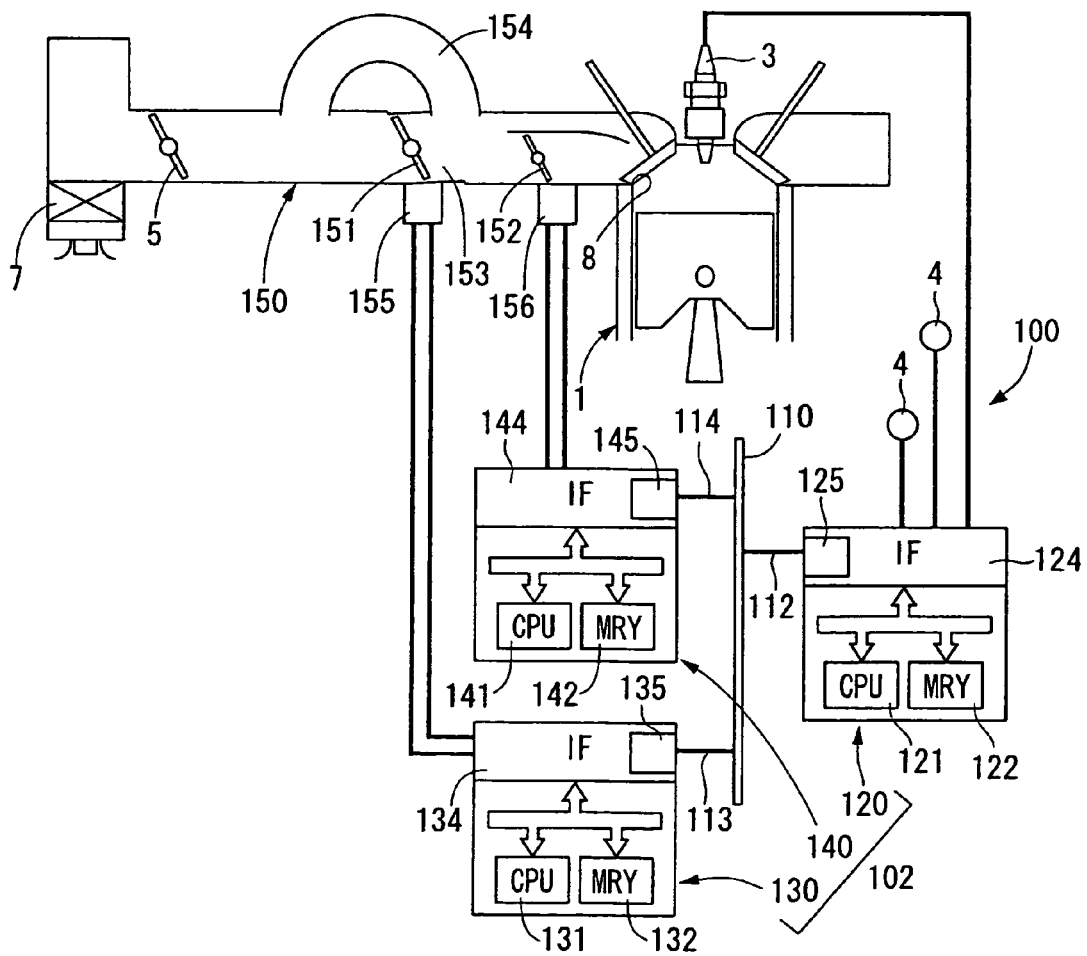
FIG. 4 is a table defining a communication method according to the first embodiment.
FIG. 5 is a table defining a communication method according to the first embodiment.
FIG. 6 is a block diagram showing a distributed control system according to a second embodiment.

As shown in FIG. 4, opening degree values are from 0 degree indicating a full close state of the throttle valve 5 to 90 degrees indicating a full open state of the throttle valve 5. Whether any opening degree value from the 0 degree to 90 degrees is to be set as the command data is determined based on state amount data received from the intake control unit 30 by the engine control unit 20, a control state of the engine 1, and a vehicle state. Opening degree values set as command data between the 0 degree and the 90 degrees may be continuously varying values or discretely varying values.

The engine control unit 20, in the interval period $T_i$ of each communication cycle period $T_c$, generates the command data, and then converts the generated data into the ratio $R_m$ of an on-pulse width $T_m$ to the cycle period $T_c$ and outputs it from the input/output IF 24 to the signal line 11. The ratio $R_m$ is represented by the percentage of the on-pulse width $T_m$ with respect to the cycle period $T_c$, as shown in (A) of FIG. 2, and set using an internal lock of the CPU 21 so as to have a linear relation with opening degree values as command data. FIG. 4 shows an example of the setting, in which the ratio $R_m$ is set to 2.5% when the command data is 0 degree, and the ratio $R_m$ is set to 25% when the command data is 90 degrees. In this embodiment, the upper limit of the ratio $R_m$ is set so that the on-pulse width $T_m$ is less than the interval period $T_i$, and is stored in the memory 22. Therefore, the engine control unit 20 can terminate the above data generation and output processing within the interval period $T_i$.

By the above processing, the command data outputted every communication cycle period $T_c$ from the engine control unit 20 to the signal line 11 is received in the input/output IF 34 of the intake control unit 30 in the interval period $T_i$ of each cycle period $T_c$. When the reception of the command data is a first reception after the engine 1 is started, the intake control unit 30, without performing response processing, performs initial processing and waits. The initial processing detects a rising edge of an on-pulse representative of the received command data, and stores the detection time point in the memory 32.

On the other hand, when the reception of the command data is a second reception after the engine 1 is started, the intake control unit 30 starts response processing.

Specifically, in the response processing, the intake control unit 30 detects the rising edge of an on-pulse representative of the received command data, stores the detected time point in the memory 32, and determines a communication cycle period $T_c$ from the difference between a current detection time point and a previous detection time point.

Next, in the response processing, from the start of the determined communication cycle period $T_c$ (in this example, current detection time point), until the interval period $T_i$ stored in the memory 32 elapses, the intake control unit 30 generates state amount data as slave data representative of an actual opening degree of the throttle valve 5. The state amount data is generated based on a signal that the intake control unit 30 receives from the drive unit 6 of the throttle valve 5, and an opening degree value from the 0 degree to the 90 degrees shown in FIG. 5. Opening degree values set as state amount data between the 0 degree and the 90 degrees may be continuously varying values or discretely varying values.

In the response processing, furthermore, when the interval period $T_i$ has elapsed from the start of the communication cycle period $T_c$, the intake control unit 30 converts the state amount data generated in the period $T_i$ into the ratio $R_s$ of the on-pulse width Ts to the period $T_i$ and outputs it from the input/output IF 34 to the signal line 11. The ratio $R_s$ is represented by the percentage of the on-pulse width Ts with respect to the cycle period $T_i$, as shown in (B) of FIG. 2, and set using an internal clock of the CPU 21 so as to have a linear relation with opening degree values as state amount data. As shown in FIG. 5, the ratio $R_s$ is set to 6.25% when the state amount data is 0 degree, and the ratio $R_s$ is set to 62.5% when the command data is 90 degrees. In this embodiment, the upper limit of the ratio $R_s$ is set so that the on-pulse width Ts is less than a remaining period $T_r$ after the period $T_i$ in the communication cycle period $T_c$, and is stored in the memory 32. Therefore, the intake engine control unit 30 can terminate the above data output processing within the remaining period $T_r$.

In any of the above initial processing and response processing, the intake control unit 30 stores the received command data in the memory 32, and feeds a drive signal corresponding to a target opening degree of the command data, to the drive unit 6 of the throttle valve 5.

By the above response processing, state amount data outputted every communication cycle period $T_c$ from the intake control unit 30 to the signal line 11 is received in the input/output IF 24 of the engine control unit 20 in a period $T_r$ of each cycle period $T_c$, and is reflected in subsequent generation of command data and the control of the engine 1.

According to the first embodiment, the transmission of command data from the engine control unit 20 as a master station to the intake control unit 30 as a slave station is performed from the start of the communication cycle period $T_c$ until an interval period $T_i$ shorter than the communication cycle period $T_c$ elapses. On the other hand, the transmission of state amount data from the intake control unit 30 to the engine control unit 20 is performed in a remaining period $T_r$ after the interval period $T_i$ in the communication cycle period $T_c$. Therefore, although the transmission of command data and the transmission of state amount data are performed through the single signal line 11 and the same communication path, they are not superimposed in each communication cycle period $T_c$ as shown in (C) of FIG. 2. Yet, since the intake control unit 30, by detecting the rising edge of an on-pulse representative of command data, recognizes the communication cycle period $T_c$ defined in another control unit 20 and determines the elapse of the period $T_i$, data superimposition in each communication cycle period $T_c$ can be prevented without fail. By these arrangements, in the first embodiment, since bidirectional communication through the same communication path can be achieved every communication cycle period $T_c$, communication time can be reduced.

Furthermore, according to the first embodiment, the command data is represented by the ratio $R_m$ of the on-pulse width $T_m$ to the communication cycle period $T_c$. The state amount data is represented by the ratio $R_s$ of the on-pulse width Ts to the interval period $T_i$. Therefore, a special electric circuit for data transmission and reception need not be provided in the control units 20 and 30, and IF circuits 25 and 35 for LIN as shown in FIG. 3 can be used, so that costs are reduced. Yet, since data indicated by the ratios $R_m$ and $R_s$ of the on-pulse widths $T_m$ and Ts has smaller errors caused by the difference between communication clocks (internal clocks of the CPUs 21 and 31) of the communication units 20 and 30 and the temperature properties of the communication clocks than data represented by the pulse widths themselves, communication accuracy becomes higher.

Therefore, according to the first embodiment, the short-time and highly accurate communication enables distributed control of high response and high accuracy, and further contributes to lower costs.

In the first embodiment, the command data is a master data and the state amount data is a slave data.

Second Embodiment

As shown in FIG. 6, a distributed control system 100 of the second embodiment is mainly constructed with a communication system 102 that combines one engine control unit 120 as a master station and two intake control units 130 and 140 as slave stations. In this communication system 102, the control units 120, 130 and 140 are connected to a common bus 110 comprising one cable 110 via individual signal lines 112, 113 and 114. Thus, the communication system 102 forms a communication network of the bus type.

In the communication system 102, the control units 120, 130 and 140, like the first embodiment are constructed with electric circuits such as microcomputers that include CPUs 121, 131 and 141, memories 122, 132 and 142, and input/output IFs 124, 134 and 144. Like the first embodiment, the input/output IFs 124, 134 and 144 are provided with IF circuits 125, 135 and 145 for LIN, to which the above signal lines 112, 113 and 114 are connected respectively. Therefore, for data transmission between the control units 120 and 130 through a communication path formed by the signal lines 112 and 113, and the common bus 110, pulse train signals that are substantially constant in voltage amplitude between a high level (H) and a low level (L) are used as shown in (A) and (B) of FIG. 7. Moreover, for data transmission between the control units 120 and 140 through a communication path formed by the signal lines 112 and 114, and the common bus 110, pulse train signals that are substantially constant in voltage amplitude between a high level (H) and a low level (L) are used as shown in (A) and (C) of FIG. 7.

The engine control unit 120 shown in FIG. 6 has the same construction as that in the first embodiment, except the contents of a program stored in the memory 122.

The intake control units 130 and 140 control an opening degree of valves 151 and 152 different from each other in an intake system 150.

Specifically, an intake pipe length changeover valve 151 changes over a flow path for flowing inhaled air in a downstream side of the throttle valve 5 between a main flow path 153 and a bypass flow path 154 longer than the main flow path 153. A drive unit 155 of the valve 151 is connected to the input/output IF 134 of the first intake control unit 130. Accordingly, the first intake control unit 130 executes a program stored in the memory 132 by the CPU 131 to feed a drive signal based on a target opening degree of the intake pipe length changeover valve 151 to the drive unit 155, and receive a signal representative of an actual opening degree of the intake pipe length changeover valve 151 from the drive unit 155. In this embodiment, when the intake pipe length changeover valve 151 is fully closed, that is, when a valve opening degree is 0 degree, the bypass flow path 154 is selected as an intake flow path. When the intake pipe length changeover valve 151 is fully opened, that is, when a valve opening degree is 90 degrees, the main flow path 153 is selected as an intake flow path.

On the other hand, the intake flow control valve 152 controls the area of a flow path immediately upstream of the intake port 8 in a downstream side of the flow paths 153 and 154, and a drive unit 156 of the valve 152 is connected to an input/output IF 144 of a second intake control unit 140. Accordingly, the second intake control unit 140 executes a program stored in the memory 142 by the CPU 141 to feed a drive signal based on a target opening degree of the intake flow control valve 152 to the drive unit 156, and receive a signal representative of an actual opening degree of the intake flow control valve 152 from the drive unit 156. In this embodiment, when the intake flow control valve 152 is fully closed, that is, when a valve opening degree is 0 degree, the area of the flow path is minimized, and when intake flow control valve 152 is fully opened, that is, when a valve opening degree is 90 degrees, the area of the flow path is maximized.

In such a communication system 102, the control units 120, 130 and 140 execute programs stored in the memories 122, 132 and 142 by the CPUs 121, 131 and 141 to achieve bidirectional communication between the units 120 and 130, and the units 120 and 140.

Hereinafter, bidirectional communication by the communication system 102 will be described in detail. In the description below, outputs of the control units 120, 130 and 140 that change a voltage level of the signal lines 112, 113 and 114, and the common bus 110 from a high level (H) to a low level (L) are referred to as on-pulse outputs.

When the engine 1 has been started, every communication cycle period $T_c$ stored in the memory 122, the engine control unit 120 performs the selection of a command target unit, and the generation of target specific data and command data from the start of each cycle period $T_c$ until an interval period $T_i$ elapses. The selection of a command target unit is the selection of one of the intake control units 130 and 140 to which a command is given, and is performed based on state amount data the engine control unit 120 receives From the intake control units 130 and 140, a control state of the engine 1, and a vehicle state. The target specific data is an ID for specifying the command target unit. In this embodiment, as shown in FIG. 8A, the ID is 1 when a command target unit is the first intake control unit 130, and 2 when a command target unit is the second intake control unit 140. Furthermore, the command data commands a target opening degree of one of the valves 151 and 152 in the intake system 150 that is to be connected to the command target unit. Also in this embodiment, the command data is an opening degree value from the 0 degree to the 90 degrees (continuous value or discrete value). Whether any opening degree value from the 0 degree to 90 degrees is to be set as the command data is determined based on state amount data received from the intake control units 130 and 140 by the engine control unit 120, a control state of the engine 1 and a vehicle state.

The engine control unit 120, in the interval period $T_i$ of each communication cycle period $T_c$, generates the target specific data and the command data, then converts the generated data as shown in (A) of FIG. 7, and outputs the converted data from the input/output IF 124 to the signal line 112. Specifically, the target specific data is converted into the ratio $R_{m1}$ of on-pulse width $T_{m1}$ to the communication cycle period $T_c$, and the command data is converted into the ratio $R_{m2}$ of on-pulse width $T_{m2}$ to the cycle period $T_c$. The ratio $R_{m1}$ is set in a range less than a first period $T_{i1}$ of the interval period $T_i$ in which on-pulse width $T_{m1}$ is achieved. FIG. 8A shows an example of the setting, in which the ratio $R_{m1}$ is set to 2.5% when the target specific data is 1, and the ratio $R_{m1}$ is set to 25% when the target specific data is 2. On the other hand, the ratio $R_{m2}$ is set in a range less than a second period $T_{i2}$ of the interval period $T_i$ in which on-pulse width $T_{m2}$ is achieved so as to have a linear relation with opening degree values as command data. FIG. 8B shows an example of the setting, in which the ratio $R_{m2}$ is set to 2.5% when the command data is 0 degree, and the ratio $R_{m2}$ is set to 25% when the command data is 90 degrees.

As shown in FIG. 7, in this embodiment, the first period $T_{i1}$ is a period from the start of the interval period $T_i$ to a midway point of the period $T_i$ (e.g., half the period $T_i$), and the second period $T_{i2}$ is a period to the end of the interval period $T_i$ after the first period $T_{i1}$. Furthermore, in this embodiment, the upper limit of the ratio $R_{m1}$ is set so that the on-pulse width $T_{m1}$ is less than the first period $T_{i1}$, and stored in the memory 122. Also, the upper limit of the ratio $R_{m2}$ is set so that the on-pulse width $T_{m2}$ is less than the second period $T_{i2}$, and stored in the memory 122. Therefore, the engine control unit 120 can terminate the above data generation and output processing within the interval period $T_i$, and yet can output the command data after outputting the target specific data.

By the above processing, the target specific data and the command data outputted every communication cycle period $T_c$ from the engine control unit 120 to the signal line 112 are transmitted to the common bus 110 and the signal lines 113 and 114 in the interval period $T_i$ of each cycle period $T_c$. The target specific data of these transmitted data is received in the input/output IFs 134 and 144 of the intake control units 130 and 140. When the reception of the target specific data is the first reception after the engine 1 is started, the intake control units 130 and 140 perform the same initial processing as in the first embodiment for on-pulses representative of the target specific data, and then ignores the command data in the same period $T_i$ as the target specific data and waits. The interval period $T_i$ is stored in the memories 132 and 142 of the intake control units 130 and 140 for use.

On the other hand, when the reception of the target specific data is a second or later reception after the engine 1 is started, the intake control units 130 and 140 detect the edge of on-pulses representative of the target specific data in the same way as the response processing of the first embodiment, and locate the communication cycle period $T_c$. The intake control units 130 and 140, when the received target specific data are not IDs for specifying them, ignore the command data in the same period $T_i$ as the target specific data and wait. On the other hand, when the received target specific data are IDs for specifying them, the intake control units 130 and 140 perform response processing of this embodiment.

Specifically, in the response processing of the first intake control unit 130, the first intake control unit 130 receives command data in the same period $T_i$ as the received target specific data and stores it in the memory 132, and feeds a drive signal corresponding to a target opening degree of the command data to the drive unit 155 of the intake pipe length changeover valve 151.

In the response processing of the first intake control unit 130, next, from the start of the communication cycle period $T_c$ until the interval period $T_i$ elapses the first intake control unit 130 generates state amount data representative of an actual opening degree of the intake pipe length changeover valve 151. The state amount data is generated by the first intake control unit 130, based on a signal received from the drive unit 155 of the intake pipe length changeover valve 151. The state amount data is an opening degree value from the 0 degree to the 90 degrees (continuously or discretely varying), as shown in FIG. 9B.

In the response processing of the first intake control unit 130, furthermore, when the interval period $T_i$ has elapsed from the start of the communication cycle period $T_c$, the first intake control unit 130 converts self-specifying data stored in the memory 132 and the state amount data generated in the period $T_i$ as shown in (B) of FIG. 7, and outputs the converted data from the input/output IF 134 to the signal line 113. Specifically, the self-specifying data is ID 1 for specifying the first intake control unit 130 as shown in FIG. 9A, and is converted into the ratio $R_{s1}$ of on-pulse width $T_{s1}$ to the interval period $T_i$. The state amount data is converted into the ratio $R_{s2}$ of on-pulse width $T_{s2}$ to the period $T_i$. The ratio $R_{s1}$ is set in a range less than a first period Tr1 of a remaining period after the interval period $T_i$ in the communication cycle period $T_c$ in which on-pulse width $T_{s1}$ is achieved. FIG. 9A shows an example of the setting, in which the ratio $R_{s1}$ is set to 6.25% correspondingly to the self-specifying data 1. On the other hand, the ratio $R_{s2}$ is set in a range less than a second period Tr2 of the remaining period $T_r$ in which on-pulse width $T_{s2}$ is achieved so as to have a linear relation with opening degree values as state amount data. FIG. 9B shows an example of the setting, in which the ratio $R_{s2}$ is set to 6.25% when the state amount data is 0 degree, and the ratio $R_{s2}$ is set to 6.25% when the command data is 90 degrees. As shown in FIG. 7, in this embodiment, the first period Tr1 is a period from the start of the remaining period $T_r$ to a midway point of the period $T_r$ (e.g., half the period $T_r$), and the second period Tr2 is a period to the end of the remaining period $T_r$ after the first period $T_{r1}$. Furthermore, in this embodiment, the upper limit of the ratio $R_{s1}$ is set so that the on-pulse width $T_{s1}$ is less than the first period Tr1, and stored in the memory 132. Also, the upper limit of the ratio $R_{s2}$ is set so that the on-pulse width $T_{s2}$ is less than the second period Tr2, and stored in the memory 132. Therefore, the first intake control unit 130 can terminate the above data generation within the interval period $T_r$, and yet can output the state amount data after outputting the self-specifying data.

Hereinbefore, response processing of the first intake control unit 130 has been described. Hereinafter, response processing of the second intake control unit 140 will be described with respect to points different from the response processing of the first intake control unit 130.

In the response processing of the second intake control unit 140, the second intake control unit 140 receives command data in the same period $T_i$ as the received target specific data and stores it in the memory 142, and feeds a drive signal corresponding to a target opening degree of the command data to the drive unit 156 of the intake flow control valve 152.

In the response processing of the second intake control unit 140, until the interval period $T_i$ elapses, the second intake control unit 140 generates state amount data representative of an actual opening degree of the intake flow control valve 152, that is, an opening degree value (continuous value or discrete value) from 0 degree to 90 degrees.

In the response processing of the second intake control unit 140, furthermore, when the interval period $T_i$ elapses, the second intake control unit 140 converts the self-specifying data stored in the memory 142 and the state amount data generated in the period $T_i$ into ratios $R_{s1}$ and $R_{s2}$, respectively, and outputs the converted data from the input/output IF 144 to the signal line 114. The self-specifying data is an ID 2 for specifying the second intake control unit 140 as shown in FIG. 9A. The ratio $R_{s1}$ representative of the self-specifying data is set in a range less than the first cycle period Tr1 of the remaining period $T_r$ of the communication cycle period $T_c$ in which the on-pulse width $T_{s1}$ is achieved, for example, "62.5%" in FIG. 9A. On the other hand, the ratio $R_{s2}$ representative of the state amount data is set as in the case of the first intake control unit 130 as shown in FIG. 9B. In the memory 142, the upper limits of the ratios $R_{s1}$ and $R_{s2}$ set as in the case of the first intake control unit 130 are stored. Therefore, the second intake control unit 140 can terminate the above data generation within the remaining period $T_r$, and yet can output the state amount data after outputting the self-specifying data.

The self-specifying data and the state amount data outputted from the intake control units 130 and 140 every communication cycle period $T_c$ are transmitted to the engine control unit 120 via the common bus 110 and the signal line 112 in the period $T_r$ of each cycle period $T_c$. The engine control unit 120 that receives the self-specifying data of these transmitted data in the input/output IF 124 determines the intake control unit that transmitted the self-specifying data and following state amount data. Furthermore, the engine control unit 120 that receives the state amount data following the self-specifying data in the input/output IF 124 stores the state amount data in the memory 122 in association with the intake control unit of transmission source determined previously to reflect it in subsequent generation of command data and the control of the engine 1.

According to the above second embodiment, data transmission from the engine control unit 120 as a master station to the intake control units 130 and 140 as slave stations is performed from the start of the communication cycle period $T_c$ until the interval period $T_i$ shorter than the communication cycle period $T_c$ elapses. On the other hand, data transmission from the intake control units 130 and 140 to the engine control unit 120 is performed in the remaining period $T_r$ after the interval period $T_i$ in the communication cycle period $T_c$. On the other hand, data transmission to the engine control unit 120 from the intake control units 130 and 140 is performed in the remaining period $T_r$ after the interval period $T_i$ in the communication cycle period $T_c$. Yet, the intake control units 130 and 140, by detecting the rising edge of an on-pulse representative of command data, recognizes the communication cycle period $T_c$ defined in another control unit 120 and determines the elapse of the period $T_i$. Therefore, by the same principle as that in the first embodiment, since data superimposition in each communication cycle period $T_c$ can be prevented without fail as shown in (D) of FIG. 7.

Furthermore, according to the second embodiment, the target specific data and the command data transmitted from the engine control unit 120 to the intake control units 130 and 140 are represented by the ratios $R_{m1}$ and $R_{m2}$ of on-pulse widths $T_{m1}$ and $T_{m2}$ to the communication cycle period $T_c$. The self-specifying data and the state amount data transmitted from the intake control units 130 and 140 to the engine control unit 120 are represented by the ratios $R_{s1}$ and $R_{s2}$ of on-pulse widths $T_{s1}$ and $T_{s2}$ to the interval period $T_i$. Therefore, in the similar manner as the first embodiment, reduction in costs and an improvement in communication accuracy can be achieved.

Still further, according to the second embodiment, in the interval period $T_i$ at each communication cycle period $T_c$, target specific data that specifies a command target unit, and command data fed to the command target unit are outputted serially from the engine control unit 120. By this construction, the intake control units 130 and 140, by receiving the command data in the same period $T_i$ as the target specific data specifying them, can selectively receive only command data for them. Therefore, data transmission from the engine control unit 120 to the multiple intake control units 130 and 140 can be correctly performed. Yet, in the second embodiment, since the command data is outputted following the target specific data, the intake control units 130 and 140, only when receiving target specific data specifying them, may receive the command data and store it in the memories 132 and 142. Therefore, the storage capacity of the memories 132 and 142 is reduced, contributing to lower costs.

Additionally, according to the second embodiment, in the remaining period $T_r$ of the interval period $T_i$ of each communication cycle period $T_c$, from one of the intake control unit 130 and 140, self-specifying data that specifies the unit concerned, and state amount data about a valve controlled by the unit concerned are outputted serially in that order. By this construction, the engine control unit 120 can correctly determine the intake control unit of transmission source from the self-specifying data received previously, and store the state amount data received subsequently in the memory 122 in association with the intake control unit of transmission source. As a result, the engine control unit 120 can correctly reflect the received state amount data in the generation of the command data and the control of the engine 1, so that the accuracy of distributed control is increased.

Thus, also according to the second embodiment, the short-time and highly accurate communication enable distributed control of high response and high accuracy, and further contribute to lower costs.

In the second embodiment, the target specific data and the command data are master data, and the target specific data is transmission destination specific data. The self-specifying data and the state amount data are slave data described, and the self-specifying data is transmission source specific data.

Third Embodiment

Figure 10:
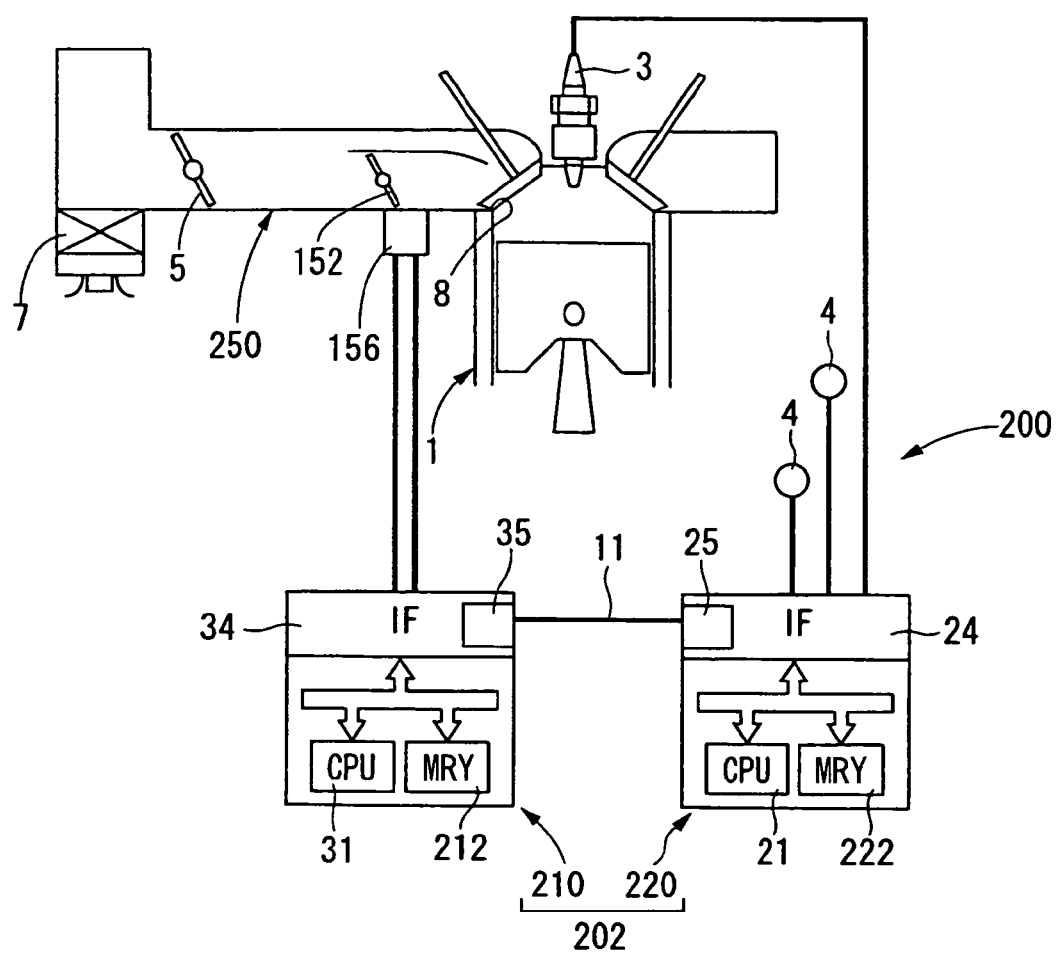
FIG. 10 is a block diagram showing a distributed control system according to a third embodiment.

As shown in FIG. 10, in a communication system 202 of a distributed control system 200 according to the third embodiment, a drive unit 156 of an intake flow control valve 152 provided in an intake system 250 is connected to an input/output IF 34 of an intake control unit 210. The construction of the intake flow control valve 152 and the drive unit 156 is substantially the same as that in the second embodiment. Accordingly, the intake control unit 210 executes a program stored in the memory 212 by the CPU 31 to feed a drive signal based on a target opening degree of the intake control unit 210 to the drive unit 156, and receive a signal representative of an actual opening degree of the intake flow control valve 152 from the drive unit 156.

In the communication system 202, the engine control unit 220 has a construction similar to the engine control unit 20 of the first embodiment, except a program stored in the memory 222.

In the communication system 202, the control units 220 and 210, started according to the startup of the engine 1, execute programs stored in the memories 222 and 212 by the CPUs 21 and 31, and thereby respectively function as a master station and a slave station to achieve bidirectional communication.

Hereinafter, bidirectional communication by the communication system 202 will be described in detail. In the description below, outputs of the control units 220 and 210 that change a voltage level of the signal line 11 from a high level (H) to a low level (L) are referred to as on-pulse outputs.

Figure 11:
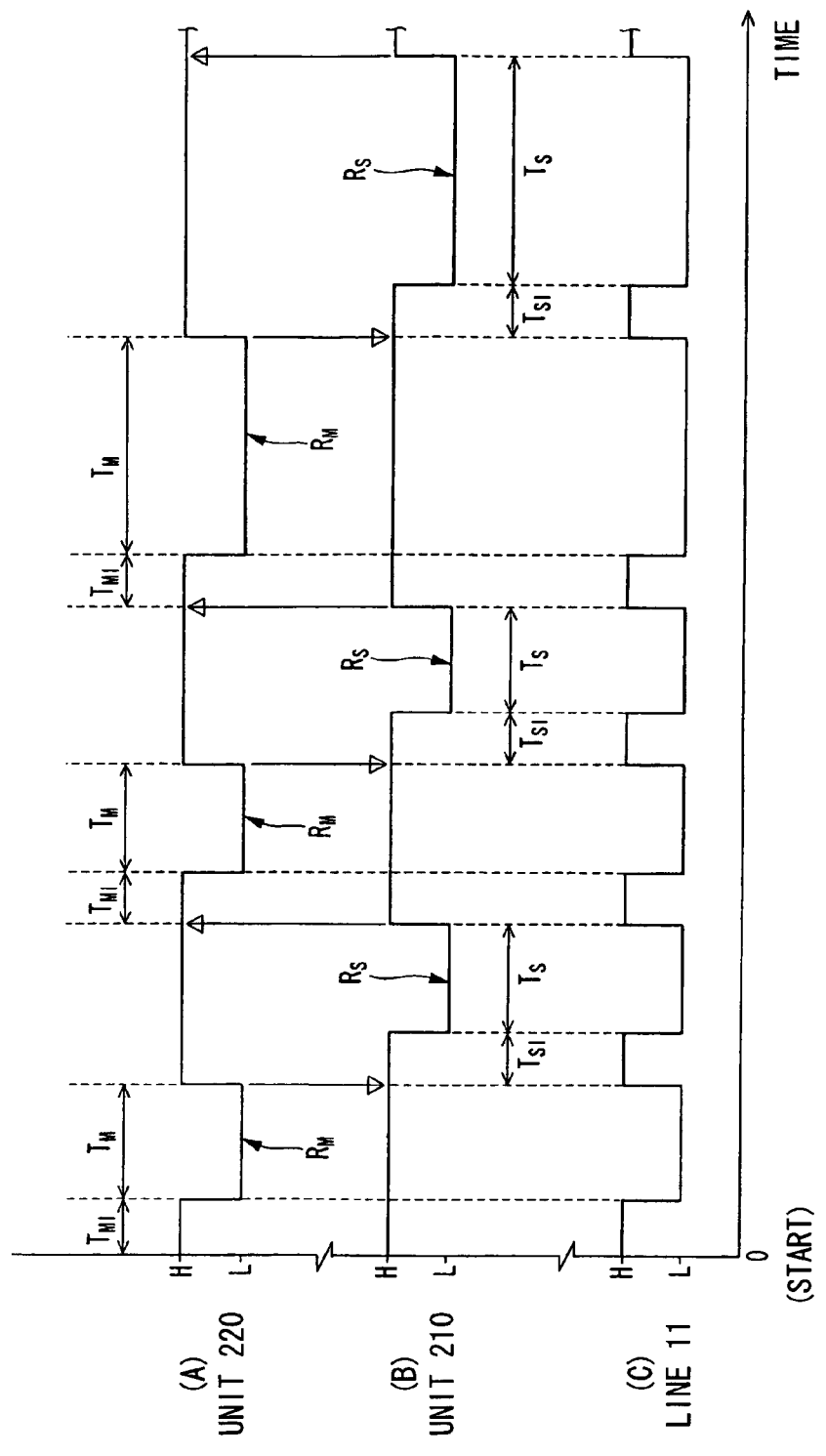
FIG. 11 is a schematic operation diagram for explaining a communication method according to the third embodiment.

As shown in (A) of FIG. 11, the engine control unit 220 sets a master idle period $T_M$ immediately after being started, and each time it receives state amount data from the intake control unit 210. In the setting of first master idle period $T_{MI}$ immediately after the startup of the engine control unit 220, the engine control unit 220 reads from the memory 222 a fixed value determined by taking into account the time during which the engine control unit 220 becomes electrically unstable immediately after the startup, and uses it as a master idle period $T_{MI}$. On the other hand, after the startup of the engine control unit 220, the setting of second or subsequent master idle period $T_{MI}$ performed each time state amount data is received are based on a load state of the engine control unit 220.

The engine control unit 220, after the startup or the reception of state amount data, generates command data until the set master idle period $T_{MI}$ elapses. The command data commands a target opening degree of the intake flow control valve 152, and have opening degree values from 0 degree to 90 degrees, as in the case of the second embodiment. Whether any opening degree value from the 0 degree to 90 degrees is to be set as the command data is determined based on state amount data, a control state of the engine 1 and a vehicle state.

Furthermore, after the startup or the reception of state amount data, when the set master idle period $T_{MI}$ has elapsed, the engine control unit 220 converts the command data generated immediately before the elapse as shown in (A) of FIG. 11, and outputs the converted data from the input/output IF 24 to the signal line 11. The command data is represented by the ratio $R_M$ of on-pulse width $T_M$ to the master idle period $T_{MI}$ set immediately before the conversion. Particularly, in this embodiment, the ratio $R_M$ representative of the command data is set to have a linear relation with opening degree values. FIG. 12 shows an example of the setting, in which the ratio $R_M$ is set to 100% when the command data is 0 degree, and the ratio $R_M$ is set to 300% when the command data is 90 degrees.

The command data outputted from the engine control unit 220 to the signal line 11 by such processing is successively received in the input/output IF 34 of the intake control unit 210. As shown in FIG. 11B, each time the intake control unit 210 receives command data from the engine control unit 220, it sets a slave idle period $T_{SI}$, based on a load state of the unit 210 itself.

The intake control unit 210 generates state amount data until the set slave idle period $T_{SI}$ elapses after receiving the command data. The state amount data is representative of an actual opening degree of the intake flow control valve 152, and has opening degree values from the 0 degree to the 90 degrees, as in the case of the second embodiment.

Furthermore, after the reception of the command data, when the set master idle period $T_{SI}$ has elapsed, the intake control unit 210 converts the state amount data generated immediately before the elapse as shown in (B) of FIG. 11, and outputs the converted data from the input/output IF 34 to the signal line 11. The command data is represented by the ratio RS of on-pulse width $T_S$ to the slave idle period $T_{SI}$ set immediately before the conversion. Particularly, in this embodiment, the ratio RS representative of the state amount data is set to have a linear relation with opening degree values. FIG. 13 shows an example of the setting, in which the ratio RS is set to 100% when the state amount data is 0 degree, the ratio RS is set to 200% when the state amount data is 45 degrees, and the ratio RS is set to 300% when the state amount data is 90 degrees.

The state amount data outputted from the intake control unit 210 to the signal line 11 by such processing is successively received in the input/output IF 24 of the engine control unit 220. Therefore, the engine control unit 220, by detecting the slave idle period $T_{SI}$ and following on-pulse width Ts, and calculating a ratio $R_s$ between them, can recognize the contents of the state amount data and reflect them in subsequent generation of command data and the control of the engine 1. Aside from the above processing, the intake control unit 210 stores the content of the command data received from the engine control unit 220 in the memory 212, and feeds a drive signal corresponding to a target opening degree of the command data to the drive unit 156 of the intake flow control valve 152. The recognition of the contents of the command data is enabled by detecting the master idle period $T_{MI}$ and following on-pulse width $T_M$, and calculating a ratio $R_M$ between them.

According to the third embodiment, the engine control unit 220, in response to data reception from the intake control unit 210, transmits data to the unit 210. The intake control unit 210, in response to data reception from the engine control unit 220, transmits data to the unit 220. Therefore, between the control units 220 and 210, as shown in FIG. 11, data transmission in one direction and data transmission in other direction are alternately repeated in the same communication path. Yet, after data reception from the intake control unit 210, when the master idle period $T_{MI}$ has elapsed, the engine control unit 220 performs data transmission. After data reception from the engine control unit 220, when the slave idle period $T_{SI}$ has elapsed, the intake control unit 210 performs data transmission. Therefore, between the control units 220 and 210, as shown in (C) of FIG. 11, data transmission in one direction and data transmission in the other direction are not performed at the same time, and are not superimposed. By these facts, in the third embodiment, bidirectional communication through the same communication path is achieved, and the communication time can be reduced.

Furthermore, according to the third embodiment, command data and state amount data transmitted between the control units 220 and 210 are represented by the ratios $R_M$ and RS of on-pulse widths $T_M$ and $T_S$ to the idle periods $T_{MI}$ and $T_{SI}$. Therefore, by the same principle as the first embodiment, reduction in costs and an improvement in communication accuracy are achieved, and the idle periods $T_{MI}$ and $T_{SI}$ bringing about the effect of preventing superposition of data transmission are also used for data representation, whereby data transmission efficiency is increased. Since on-pulse width $T_M$ and $T_S$, and the ratios $R_M$ and RS of the third embodiment have higher setting freedom than the on-pulse width $T_M$ and $T_S$, and the ratios $R_M$ and RS of the first embodiment, programs for achieving bidirectional communication can be simplified, and reduced in costs.

Figure 14:
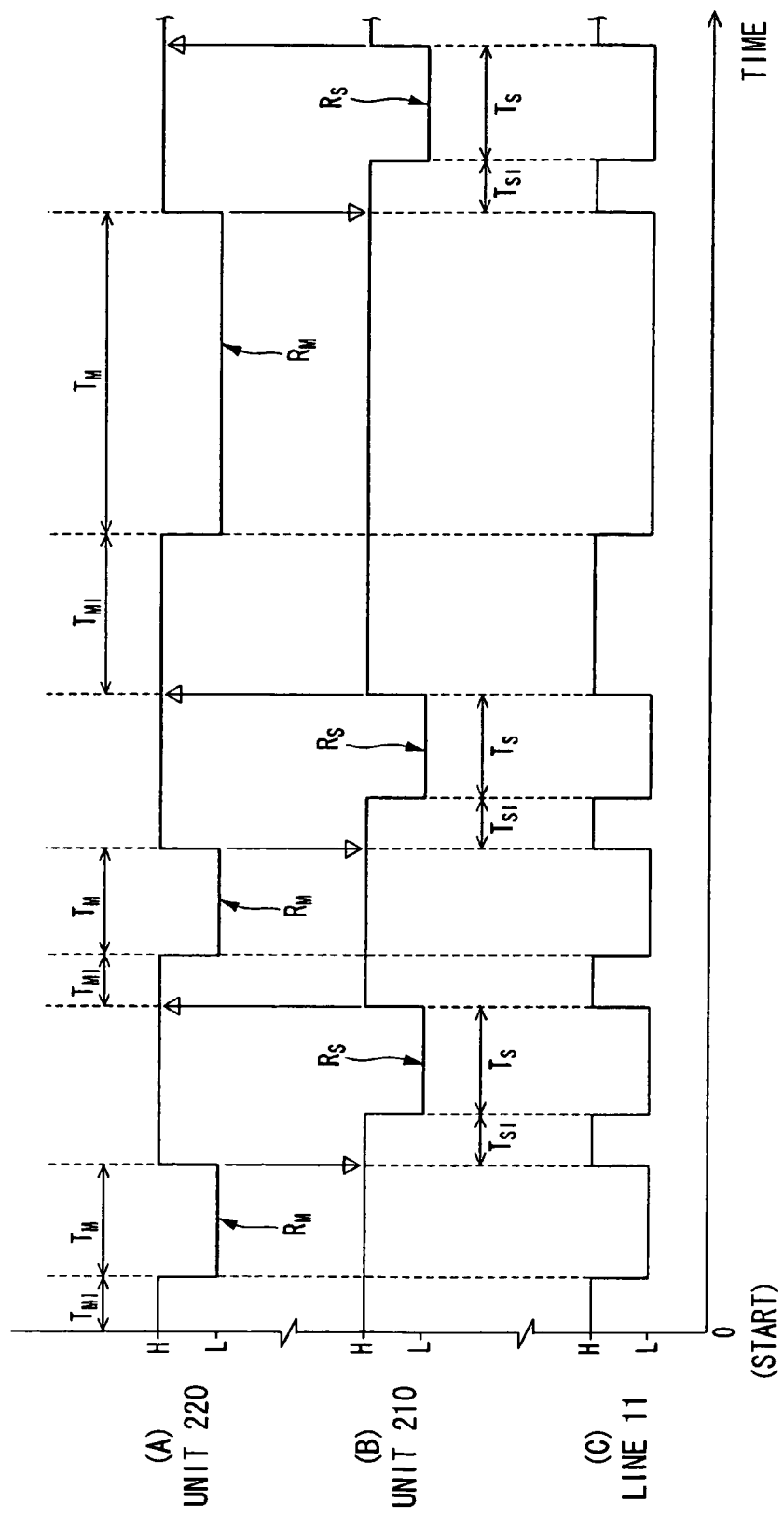
FIG. 14 is a schematic operation diagram for explaining a communication method according to the third embodiment.
Figure 15:
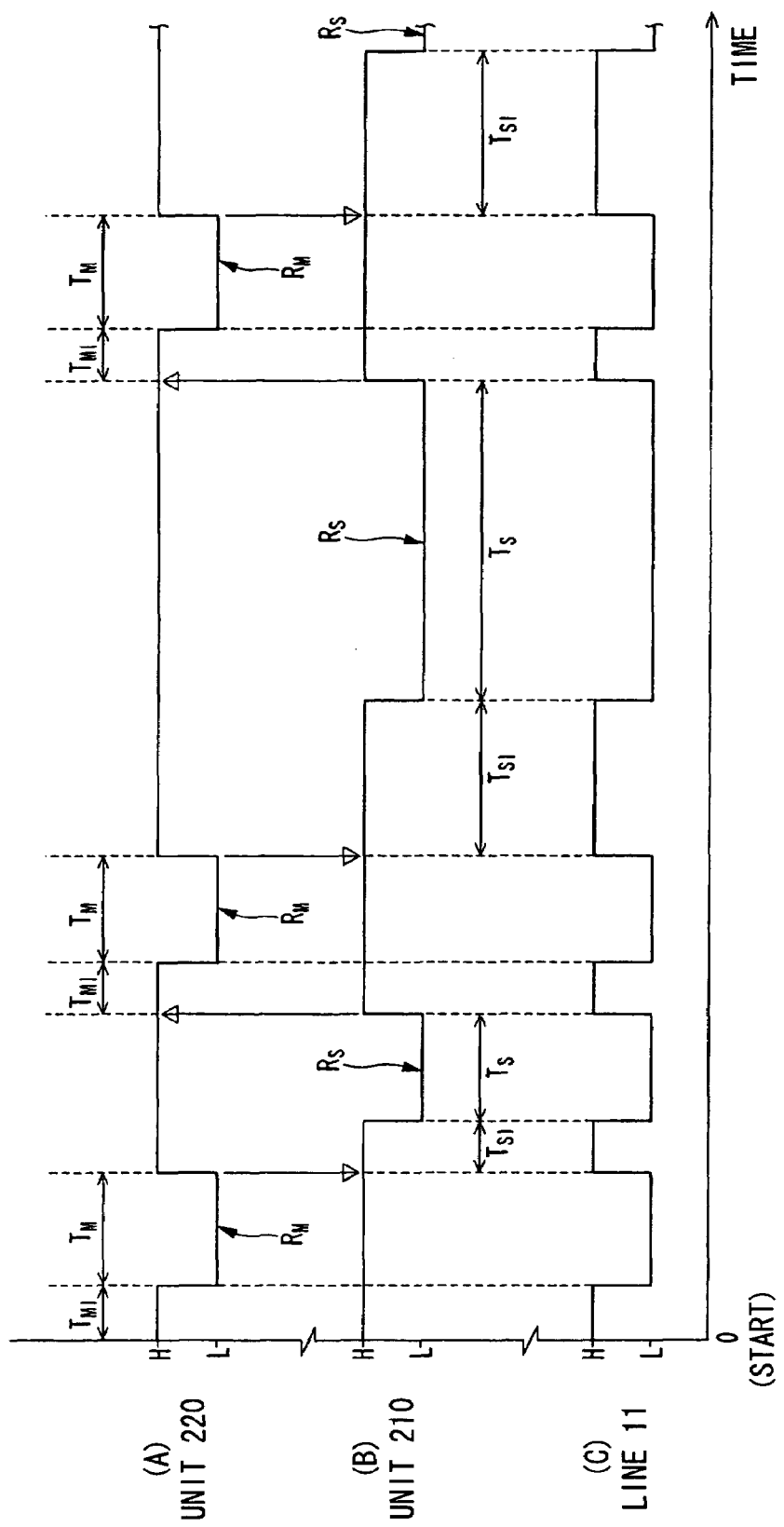
FIG. 15 is a schematic diagram for explaining a communication method according to the third embodiment.

Furthermore, according to the third embodiment, the control units 220 and 210 can adjust the idle periods $T_{MI}$ and $T_{SI}$ according to load states. Therefore, for example, when a control processing load of the engine control unit 220 becomes large during high-speed rotation of the engine 1 or because of control of the engine 1, as shown in FIG. 14, the master idle period $T_{MI}$ can be extended to reduce a communication load of the engine control unit 220. During high-speed rotation of the engine 1, when a control processing load of the engine control unit 220 is large, and an opening degree of the intake flow control valve 152 has only to be held, as shown in FIG. 15, the slave idle period $T_{SI}$ can be extended to reduce a communication load of the engine control unit 220. Of course, during high-speed rotation of the engine 1, both the idle periods $T_{MI}$ and $T_{SI}$ can be extended to significantly reduce a communication load of the engine control unit 220.

Thus, also according to the third embodiment, the short-time and highly accurate communication enables distributed control of high response and high accuracy, and further contributes to lower costs.

In the third embodiment, the command data is master data, and the state amount data is slave data.

Fourth Embodiment

Figure 16:
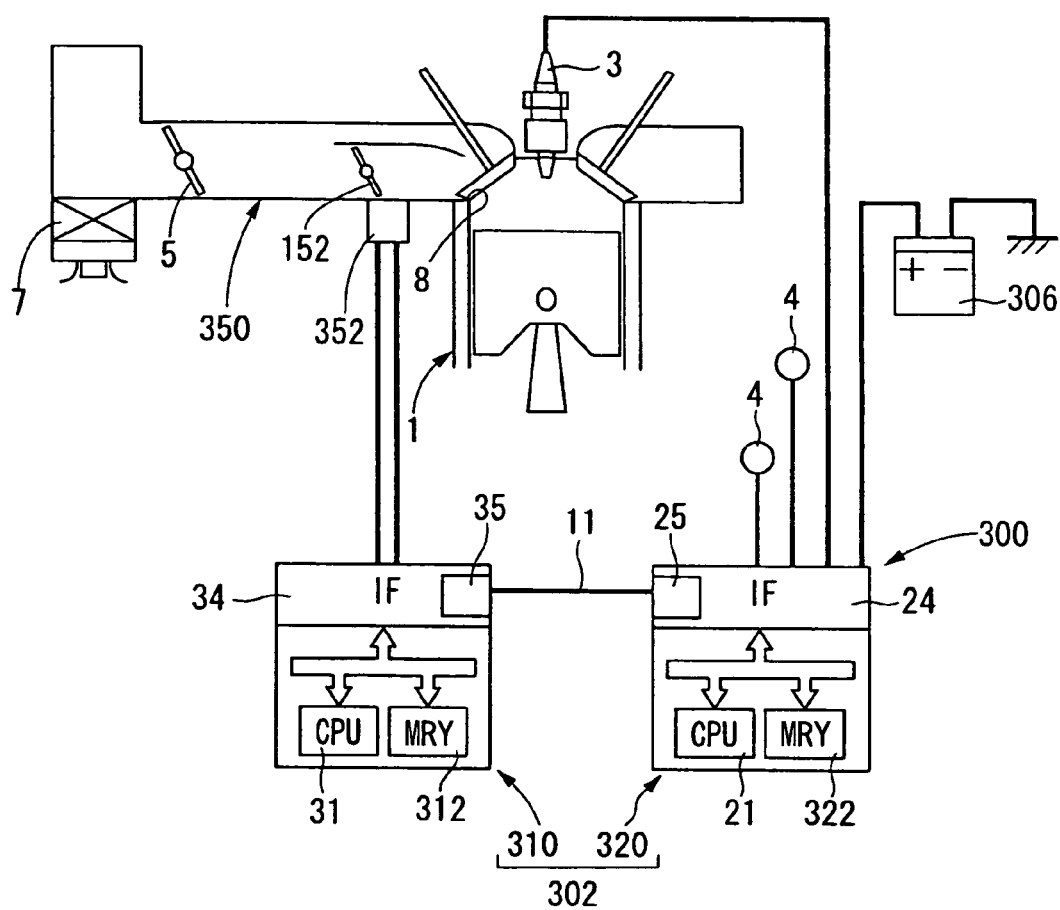
FIG. 16 is a block diagram showing a distributed control system according to a fourth embodiment.

As shown in FIG. 16, in a communication system 302 of a distributed control system 300, in addition to a signal representative of an actual opening degree of an intake flow control valve 152 of an intake system 350, the intake control unit 310 receives a signal representative of a diagnosis result from a drive unit 352 of the intake flow control valve 152. The diagnosis result is a result that the drive unit 352 diagnoses its own abnormality and detection abnormality of an actual opening degree of the intake flow control valve 152. In the description below, a diagnosis result when no abnormality is found in both the drive unit 352 and actual opening degree detection is referred to as normality, a diagnosis result when abnormality is found in the drive unit 352 is referred to as unit abnormality, and a diagnosis result when abnormality is found in actual opening degree detection is referred to as detection abnormality.

In the communication system 302, a power supply 306 that supplies power to vehicle electric equipment such as a drive unit 352 of the intake flow control valve 152 is connected to the input/output IF 24 of an engine control unit 320, and the engine control unit 320 monitors voltage values of the power supply 306.

In the communication system 302, the control units 320 and 310, started according to the startup of the engine 1, execute programs stored in the memories 22 and 32 by the CPUs 21 and 31, and thereby respectively function as a master station and a slave station to achieve bidirectional communication.

Hereinafter, bidirectional communication by the communication system 302 will be described in detail. In the description below, outputs of the control units 320 and 310 that change a voltage level of the signal line 11 from a high level (H) to a low level (L) are referred to as on-pulse outputs.

As shown in FIG. 27A, the engine control unit 320 sets a master idle period $T_{MI}$ immediately after being started, and each time it receives slave data from the intake control unit 310. The setting of first master idle period $T_{MI}$ immediately after the startup of the engine control unit 320 is the same as that in the third embodiment.

On the other hand, in the setting of second master idle period $T_{MI}$ performed on reception of first slave data after the engine control unit 320 is started, the engine control unit 320 selects the type of master data outputted subsequently, and changes the master idle period $T_{MI}$ according to the selected type. The master data has two types of data: command data that commands a target opening degree of the intake flow control valve 152, and monitoring data representative of a voltage value of the power supply 306. When first master data outputted by the engine control unit 320 before receiving first slave data after the startup is designated as initial master data, in second master idle period $T_{MI}$, the ratio $P_{M0}$ to on-pulse width $T_{M0}$ representative of the initial master data represents the type of the master data.

FIG. 18A shows a setting example of a ratio $P_{M0}$ representative of a second master idle period $T_{MI}$, in which the ratio $P_{M0}$ is set to a value (e.g., 50%) of 100% or less when selected master data is command data, and the ratio $P_{M0}$ is set to a value (e.g., 200%) of more than 100% when selected master data is monitoring data.

On the other hand, after the startup of the engine control unit 320, in the setting of third or later master idle period TIM performed for each of the reception of second or later slave data, a method of changing the master idle period TIM after selecting the type of master data is different from the case of second master idle period $T_{MI}$. Specifically, in third or later master idle period $T_{MI}$, a ratio PM to the master idle period $T_{MI}$ set previously represents the type of master data. FIG. 18B shows a setting example of a ratio PM representative of a third or later master idle period $T_{MI}$, in which the ratio PM is set to a value (e.g., 50%) of 100% or less when selected master data is command data, and the ratio PM is set to a value (e.g., 200%) of more than 100% when selected master data is monitoring data.

Following the setting (hereinafter simply referred to as $T_{MI}$ setting) of master idle period $T_{MI}$, the engine control unit 320 generates command data or monitoring data as master data after the startup or until the setting period $T_{MI}$ elapses after the reception of slave data. In processing after first $T_{MI}$ setting or second and third or later $T_{MI}$ setting when command data is selected as master data, the same command data as in the third embodiment is generated. On the other hand, in processing after second and third or later $T_{MI}$ setting when monitoring data is selected as master data, monitoring data from 8V to 16V is generated based on the result of monitoring voltage values of the power supply 306.

Figure 17:
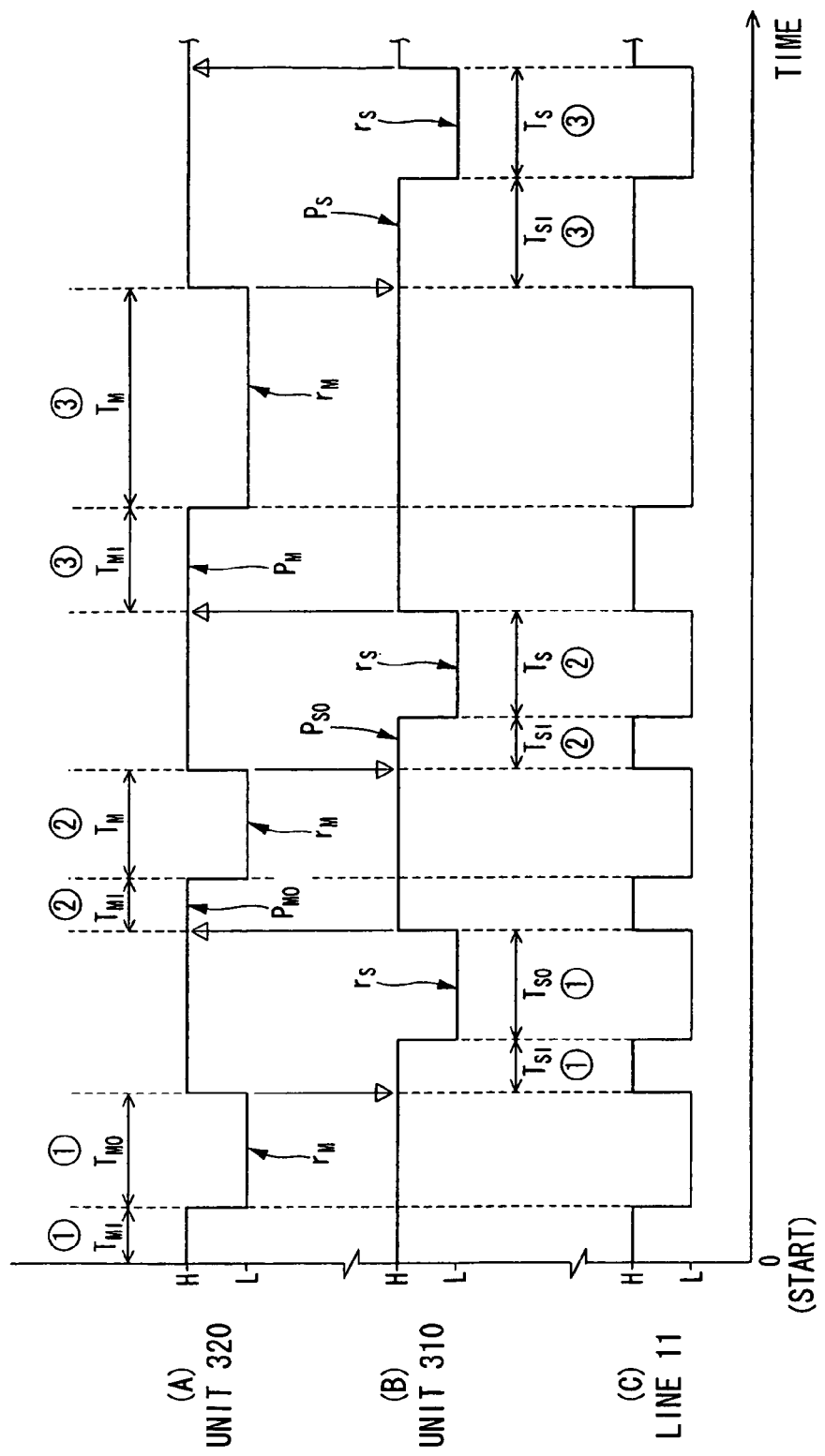
FIG. 17 is a schematic operation diagram for explaining a communication method according to the fourth embodiment.

Furthermore, after the startup or the reception of the slave data, when the set master idle period $T_{MI}$ has elapsed, the engine control unit 320 converts the command data or monitoring data generated as master data immediately before the elapse as shown in (A) of FIG. 17, and outputs the converted data from the input/output IF 24 to the signal line 11. The command data and the monitoring data are represented by the ratio $r_M$ of on-pulse width $T_M$ to the master idle period $T_{MI}$ set immediately before the conversion. Particularly, in this embodiment, the ratio $r_M$ representative of the command data is set to have a linear relation with opening degree values.

FIG. 19A shows an example of the setting, in which the ratio $r_M$ is set to 100% when the command data is 0 degree, the ratio $r_M$ is set to 200% when the command data is 45 degrees, and the ratio $r_M$ is set to 300% when the command data is 90 degrees. In this embodiment, the ratio $r_M$ representative of the monitoring data is set to have a linear relation with voltage values. FIG. 19B shows an example of the setting, in which the ratio $r_M$ is set to 100% when the monitoring data is 8V, the ratio $r_M$ is set to 200% when the monitoring data is 12V, and the ratio $r_M$ is set to 300% when the monitoring data is 16V.

The master data outputted from the engine control unit 320 to the signal line 11 by such processing is successively received in the input/output IF 34 of the intake control unit 310. As shown in (B) of FIG. 17, each time the intake control unit 310 receives master data from the engine control unit 320, it sets a slave idle period $T_{SI}$. In a first slave idle period $T_{SI}$ performed on the reception of first master data after the startup of the intake control unit 310, a predetermined fixed value is read as a slave idle time $T_{SI}$ from the memory 222.

On the other hand, in the setting of second slave idle period $T_{SI}$ performed on reception of second master data after the intake control unit 310 is started, the intake control unit 310 selects the type of slave data outputted subsequently, and changes the slave idle period $T_{SI}$ according to the selected type. The slave data has two types of data: state amount data representative of an actual opening degree of the intake flow control valve 152, and diagnostic data representative of a diagnosis result by the drive unit 352. When first slave data outputted by the engine control unit 310 before receiving second master data after the startup is designated as initial slave data, in second slave period $T_{SI}$, the ratio $P_{S0}$ to on-pulse width $T_{S0}$ representative of the initial slave data represents the type of the slave data. FIG. 20A shows a setting example of a ratio $P_{S0}$ representative of a second slave idle period $T_{SI}$, in which the ratio $P_{M0}$ is set to a value (e.g., 50%) of 100% or less when selected slave data is state amount data, and the ratio $P_{M0}$ is set to a value (e.g., 200%) of more than 100% when selected slave data is diagnostic data.

On the other hand, after the startup of the engine control unit 310, in the setting of third or later slave idle period $T_{SI}$ performed for each of the reception of third or later slave data, a method of changing the slave idle period $T_{SI}$ after selecting the type of slave data is different from the case of second slave idle period $T_{SI}$. Specifically, in third or later slave idle period $T_{SI}$, a ratio $P_S$ to the slave idle period $T_{SI}$ set previously represents the type of slave data. FIG. 20B shows a setting example of a ratio $P_S$ representative of a third or later slave idle period $T_{SI}$, in which the ratio $P_S$ is set to a value (e.g., 50%) of 100% or less when selected slave data is state amount data, and the ratio $P_S$ is set to a value (e.g., 200%) of more than 100% when selected slave data is diagnostic data.

Following the setting ($T_{SI}$ setting) of slave idle period $T_{SI}$, the intake control unit 310 generates state amount data or diagnostic data as slave data until the setting period $T_{SI}$ elapses after the reception of master data. In processing after first $T_{SI}$ setting or after second and third or later $T_{SI}$ setting when state amount data is selected as slave data, the same state amount data as in the third embodiment is generated. On the other hand, in processing after second and third or later $T_{SI}$ setting when diagnostic data is selected as slave data, diagnostic data representative of one of normality, unit abnormality, and detection abnormality is generated.

Furthermore, after the reception of the master data, when the set slave idle period $T_{SI}$ has elapsed, the intake control unit 310 converts the state amount data or diagnostic data generated as slave data immediately before the elapse as shown in (B) of FIG. 17, and outputs the converted data from the input/output IF 24 to the signal line 11. The state amount data and the diagnostic data and the monitoring data are represented by the ratio $r_S$ of on-pulse width $T_S$ (including $T_{S0}$) to the slave idle period $T_{SI}$ set immediately before the conversion. Particularly, in this embodiment, the ratio $r_S$ representative of the state amount data is set to have a linear relation with opening degree values.

FIG. 21A shows an example of the setting, in which the ratio $r_S$ is set to 100% when the state amount data is 0 degree, the ratio $r_S$ is set to 200% when the state amount data is 45 degrees, and the ratio $r_S$ is set to 300% when the state amount data is 90 degrees. In this embodiment, the ratio $r_S$ representative of the monitoring data is set to have a discrete value with respect to the diagnosis results. FIG. 21B shows an example of the setting, in which the ratio $r_S$ is set to 100% when the diagnosis result is normality, the ratio $r_S$ is set to 200% when the diagnosis result is unit abnormality, and the ratio $r_S$ is set to 300% when the diagnosis result is detection abnormality.

The slave data outputted from the intake control unit 310 to the signal line 11 by such processing is successively received in the input/output IF 24 of the engine control unit 320. Therefore, the engine control unit 320, by detecting the slave idle period $T_{SI}$ and following on-pulse width Ts, and detecting a ratio rs between them, can recognize the contents of the slave data and reflect them in subsequent generation of command data and the control of the engine 1. Aside from the above processing, the intake control unit 310 stores the content of the command data and monitoring data received from the engine control unit 320 in the memory 312, corrects a drive signal corresponding to a target opening degree of the command data according to the monitoring data, and feeds the drive signal to the drive unit 352. The recognition of the contents of the command data and the monitoring data is enabled by detecting the master idle period $T_{MI}$ and following on-pulse width $T_M$, and calculating a ratio $r_M$ between them.

According to the fourth embodiment described above, when the master idle period $T_{MI}$ has elapsed after data reception from the intake control unit 310, the engine control unit 320 transmits data to the intake control unit 310. When the slave idle period $T_{SI}$ has elapsed after data reception from the engine control unit 320, the intake control unit 310 transmits data to the engine control unit 320. Therefore, between the control units 320 and 310, as shown in FIG. 17, data transmission in one direction and data transmission in other direction are alternately achieved and not superimposed. Accordingly, communication time of bidirectional communication through the same communication path can be reduced.

According to the fourth embodiment, the master data and the slave data transmitted between the control units 320 and 310 are represented by the ratios $r_M$ and rs of on-pulse widths $T_M$ and $T_S$ to the idle periods $T_{MI}$ and $T_{SI}$ that bring about the effect of preventing these data from be superimposed, and yet the freedom to set the ratios $r_M$ and rs is high. Therefore, reduction in costs and an improvement in communication accuracy can be achieved, and data transmission efficiency can be increased.

Furthermore, according to the fourth embodiment, the engine control unit 320 is started, and before third or later master data is outputted after second or later slave data is received, the setting of third or later master idle period $T_{MI}$ is performed. According to the setting, the type of third or later master data is represented by the ratio PM between third or later master idle period $T_{MI}$ and a first preceding master idle period $T_{MI}$. Therefore, the intake control unit 310, by detecting the third or later master idle period $T_{MI}$ after the startup and the first preceding master idle period $T_{MI}$, and calculating the ratio PM between them, can identify the type of master data received at the third time or later after the startup.

Likewise, according to the fourth embodiment, the intake control unit 310 is started, and before third or later slave data is outputted after third or later master data is received, the setting of third or later slave idle period $T_{SI}$ is performed. According to the setting, the type of third or later slave data is represented by the ratio $P_S$ between third or later slave idle period $T_{SI}$ and a preceding slave idle period $T_{SI}$. Therefore, the engine control unit 320, by detecting the third or later master idle period $T_{SI}$ after the startup and the preceding master idle period $T_{SI}$, and calculating the ratio $P_S$ between them, can identify the type of slave data received at the third time or later after the startup. Accordingly, by utilizing the idle periods $T_{MI}$ and $T_{SI}$, multiple types of the master data and slave data can be transmitted, to increase the data transmission efficiency.

Additionally, according to the fourth embodiment, before the engine control unit 320 outputs second master data after receiving first slave data after the startup, the setting of second master idle period $T_{MI}$ is performed. According to this setting, the type of second master data is represented not by a ratio between the second master idle period $T_{MI}$ and first preceding master idle period $T_{MI}$ immediately after the startup, but by a ratio $P_{M0}$ between the second master idle period $T_{MI}$ and on-pulse width $T_{M0}$ corresponding to initial master data. An on-pulse having width $T_{M0}$ is outputted after the elapse of the master idle period $T_{MI}$ immediately after the startup that is electrically unstable. Therefore, the intake control unit 310, by detecting second master idle period $T_{MI}$ after the startup and on-pulse width $T_{M0}$ corresponding to initial master data and calculating a ratio PM between them, can identify the type of master data received at the second time after the startup.

Additionally, according to the fourth embodiment, before the intake control unit 310 outputs second slave data after receiving second master data after the startup, the setting of second slave idle period $T_{SI}$ is performed. According to this setting, the type of second slave data is represented by a ratio $P_{S0}$ between the second slave idle period $T_{SI}$ and on-pulse width $T_{S0}$ corresponding to initial slave data. Therefore, the engine control unit 320, by detecting second slave idle period $T_{SI}$ after the startup and on-pulse width $T_{S0}$ corresponding to initial slave data and calculating a ratio $P_S$ between them, can identify the type of master data received at the second time after the startup. Therefore, also in this case, since the slave idle period $T_{SI}$ can be effectively used for multiple types of data transmission, data transmission efficiency can be further increased.

Thus, also according to the fourth embodiment, the short-time and highly accurate communication enables distributed control of high response and high accuracy, and further contributes to lower costs.

The above embodiments may be modified in various ways.

For example, in the first and second embodiments, the communication cycle period $T_c$ in the engine control units 20 and 120 may be variable. Also in this case, the intake control units 30, 130 and 140 can correctly recognize the communication cycle period $T_c$ by detecting the edge of pulse. In this case, the interval period $T_i$ in the control units 20, 30, 120, 130 and 140 change depending on the communication cycle period $T_c$.

Furthermore, in the first embodiment, in initial processing of the intake control unit 30, a command of a valve opening degree following received command data may not be executed. In the second embodiment, when target specific data by the intake control units 130 and 140 is received for the first time after the startup of the engine 1, when the target specific data identifies the intake control units 130 and 140 themselves, following command data may be received to perform processing a valve opening degree following it.

Furthermore, in the first and the second embodiments, transmission data may be represented not by ratios $R_m$, $R_s$, $R_{m1}$, $R_{m2}$, $R_{s1}$ and $R_{s2}$ of on-pulse widths $T_m$, $T_s$, $T_{m1}$, $R_{m2}$, $T_{s1}$ and $T_{s2}$ to the communication cycle period $T_c$ or interval period $T_i$ but by the ratio of off-pulse width to the communication cycle period $T_c$ or interval period $T_i$. In the first and second embodiments, instead of performing edge detection for identifying the communication cycle period $T_c$ on a rising edge of on-pulse (falling edge of off-pulse), it may be performed on a falling edge of on-pulse (rising edge of off-pulse) or for both of them. In these variants, off-pulse outputs denote outputs of the control units that change voltage levels of the signal line and the common bus from a low level to a high level.

Additionally, in the first and the second embodiments, two or more of control data and state amount data may be transmitted in periods $T_i$ and $T_r$, respectively.

Additionally, in the second embodiment, a connection of the engine control unit 120 and the intake control units 130 and 140 may be a star type or a ring type. In the second embodiment, three or more intake control units as slave stations may be connected to the common bus 110. For example, in addition to the intake control units 130 and 140, the intake control unit 30 of the first embodiment may be connected to the common bus 110. Furthermore, in the second embodiment, an output order of target specific data and command data in period $T_i$ may be reversed, or an output order of self-specifying data and state amount data in period $T_r$ may be reversed.

Furthermore, in the third and the fourth embodiments, transmission data may be represented not by the ratios $R_M$, $R_s$, $r_M$ and $r_s$ of the on-pulse widths $T_M$ and $T_S$ to the idle periods $T_{MI}$ and $T_{SI}$ but by the ratio of off-pulse widths to idle periods $T_{MI}$ and $T_{SI}$. In the fourth embodiment, when the ratio of off-pulse width is used for the representation of transmission data, the type of second master data and the type of second slave data may be represented by a ratio between second master idle period $T_{MI}$ and second slave idle period $T_{SI}$, and off-pulse widths corresponding to initial master data and initial slave data. In these variants, off-pulse outputs denote outputs of the control units that change voltage levels of the signal line from a low level to a high level. In the fourth embodiment, by the setting of second slave idle period $T_{SI}$, the type of second slave data may be represented by a ratio between second slave idle period $T_{SI}$ and preceding first slave idle period $T_{SI}$.

In the first to the fourth embodiments, descriptions have been made of examples of application of the present invention to bidirectional communication between the engine control units 20, 120, 220 and 320, and the intake control units 30, 130, 140, 210 and 310 in the distributed control systems for vehicle 10, 100, 200 and 300. Application targets of the present invention are not limited to this. That is, in the distributed control systems for vehicle, the present invention can apply for bidirectional communication between control units as master stations and at least one of control units as slave stations. Besides, the present invention may apply for bidirectional communication between control units in a distributed control system for other than vehicle, and bidirectional communication between two stations not constituting a distributed control system.

What is claimed is:

1. A communication system comprising:
   a master station and a slave station for bidirectional communication therebetween every communication cycle period; and
   a same communication path connecting the master station and the slave station for the bidirectional communication,
   wherein, from a start of the communication cycle period until an interval period shorter than the communication cycle period elapses, the master station transmits master data represented in a ratio of pulse width to the communication cycle period to the slave station, and
   wherein, in a remaining period after the interval period in the communication cycle period, the slave station transmits slave data represented in the ratio of pulse width to the interval period to the master station.

2. The communication system according to claim 1, wherein the slave station recognizes the start of the communication cycle period by detecting an edge of a pulse representative of the master data.

3. The communication system according to claim 1, wherein the communication cycle period and the interval period are fixed.

4. The communication system according to claim 1, wherein the master station serially transmits plural pieces of the master data to the slave station in the interval period.

5. The communication system according to claim 1, wherein the slave station serially transmits plural pieces of the slave data to the master station in the remaining period.

6. The communication system according to claim 1, wherein the slave station is provided in plural numbers, wherein the master station serially outputs plural pieces of the master data including transmission destination specific data specifying each slave station of transmission destination to the communication path in the interval period, and
   wherein each slave station receives the master data outputted from the master station in the same interval period as the transmission destination specific data specifying them.

7. The communication system according to claim 6, wherein the master station outputs the master data other than the transmission destination specific data after outputting the transmission destination specific data.

8. The communication system according to claim 6, wherein, in response to reception of the transmission destination specific data specifying the slave station, the slave station serially transmit plural pieces of the slave data including transmission source specific data to the master station in the remaining period.

9. The communication system according to claim 8, wherein the slave station transmit the slave data other than the transmission source specific data after transmitting the transmission source specific data.

10. The communication system according to claim 6, further comprising:
    a common bus connecting the master station and each slave station one another,
    wherein the common bus forms the communication path among the master station and each slave station.

11. A distributed control system comprising:
    the communication system according to claim 1,
    wherein the master station and the slave station distributedly control respective control targets.

12. The distributed control system according to claim 11,
    wherein the master station generates command data for commanding control state of the control target of the slave station as the master data, and
    wherein the slave station generates state amount data representative of state amount of the control targets as the slave data.

13. A communication method of performing bidirectional communication through a same communication path every communication cycle period between a master station and a slave station, the method comprising steps of:
    transmitting, from a start of a communication cycle period until an interval period shorter than the communication cycle period elapses, master data represented in a ratio of pulse width to the communication cycle period from the master station to the slave station; and
    transmitting, in a remaining period after the interval period in the communication cycle period, transmitting slave data represented in the ratio of pulse width to the interval period from the slave station to the master station.

14. The communication method according to claim 13, further comprising:
    Recognizing, in the slave station, the start of the communication cycle period by detecting an edge of a pulse representative of the master data.

15. The communication method according to claim 13,
    wherein the communication cycle period and the interval period are fixed.

16. The communication method according to claim 13,
    wherein the master station serially transmits plural pieces of the master data to the slave station in the interval period.

17. The communication method according to claim 13,
    wherein the slave station serially transmits plural pieces of the slave data to the master station in the remaining period.

18. The communication method according to claim 13,
wherein the slave station is provided in plural numbers,
wherein the master station serially outputs plural pieces of the master data including transmission destination specific data specifying each slave station of transmission destination to the communication path in the interval period, and
wherein each slave station receives the master data outputted from the master station in a same interval period as the transmission destination specific data.

19. The communication method according to claim 18,
wherein the master station outputs the master data other than the transmission destination specific data after outputting the transmission destination specific data.

20. The communication method according to claim 18,
wherein each slave station, receiving the transmission destination specific data specifying the slave station as a responding slave station, serially transmits plural pieces of the slave data including transmission source specific data specifying the responding slave station from the responding slave station to the master station in the remaining period.

21. The communication method according to claim 20,
wherein the responding station transmits the slave data other than the transmission source specific data after transmitting the transmission source specific data.

22. A distributed control method comprising steps of:
performing the bidirectional communication by the communication method according to claim 13; and
distributedly controlling respective control targets of the master station and the slave station.

23. The distributed control method according to claim 22,
wherein the master station generates command data for commanding control state of the control target of the slave station as the master data; and
the slave station generates state amount data representative of state amount of the control target as the slave data.

* * * * *